US007301903B2

United States Patent
Brady

(10) Patent No.: US 7,301,903 B2
(45) Date of Patent: Nov. 27, 2007

(54) METHOD AND APPARATUS FOR ACHIEVING AN OPTIMAL RESPONSE TIME IN A TELECOMMUNICATIONS SYSTEM

(75) Inventor: James F. Brady, Carson City, NV (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 848 days.

(21) Appl. No.: 10/701,725

(22) Filed: Nov. 4, 2003

(65) Prior Publication Data

US 2004/0165531 A1    Aug. 26, 2004

Related U.S. Application Data

(60) Provisional application No. 60/423,608, filed on Nov. 4, 2002.

(51) Int. Cl.
*H04L 12/24* (2006.01)
*H04L 1/00* (2006.01)

(52) U.S. Cl. ...................... 370/230; 370/236
(58) Field of Classification Search ............... 370/229, 370/230, 232, 231, 235, 253, 236, 252, 466, 370/467, 468, 401, 398, 352
See application file for complete search history.

(56) References Cited

U.S. PATENT DOCUMENTS

| | | | | |
|---|---|---|---|---|
| 5,956,322 A | * | 9/1999 | Charny | 370/236.1 |
| 6,856,676 B1 | * | 2/2005 | Pirot et al. | 379/201.01 |
| 2002/0126686 A1 | * | 9/2002 | McKinnon et al. | 370/442 |
| 2003/0107988 A1 | * | 6/2003 | Lodha et al. | 370/229 |

\* cited by examiner

*Primary Examiner*—Chau Nguyen
*Assistant Examiner*—Farah Faroul
(74) *Attorney, Agent, or Firm*—Staas & Halsey LLP

(57) ABSTRACT

Response time estimation is provided to forecast the response times of a telecommunications device, particularly, a media gateway (206a . . . *n*). A soft switch (216) switches communication data in a telecommunications network. A call feature server (202) performs call control functions. At least one media gateway (206a) for providing access to telecommunications transmission facilities. A packet manager (204) coupled to both the call feature server (216) and the media gateway (206a) implements message protocol conversion and call flow setup. The packet manager (204) includes a response time estimation module (208) for preventing traffic overload of the media gateway (206a) by the call feature server (202). Message retransmission times for the soft switch (216) are processed by the response time estimation module (208) based on empirical response times from the media gateway (206a) according to a exponential smoothing function.

10 Claims, 6 Drawing Sheets

FIG. 5A

| COUNT | OBSERVE | FORECAST | DIFF | SUM DIFF |
|---|---|---|---|---|
| 1 | 571 | 571 | 0 | 0 |
| 2 | 565 | 568 | -3 | -3 |
| 3 | 564 | 566 | -2 | -5 |
| 4 | 936 | 658 | 278 | 273 |
| 5 | 576 | 641 | -65 | 208 |
| 6 | 574 | 629 | -55 | 153 |
| 7 | 569 | 620 | -51 | 102 |
| 8 | 563 | 612 | -49 | 53 |
| 9 | 562 | 606 | -44 | 9 |
| 10 | 570 | 602 | -32 | -23 |
| 11 | 585 | 599 | -14 | -37 |
| 12 | 573 | 594 | -21 | -58 |
| 13 | 570 | 589 | -19 | -77 |
| 14 | 574 | 586 | -12 | -89 |
| 15 | 570 | 581 | -11 | -100 |
| 16 | 567 | 576 | -9 | -109 |
| 17 | 567 | 574 | -7 | -116 |
| 18 | 563 | 570 | -7 | -123 |
| 19 | 562 | 568 | -6 | -129 |
| 20 | 569 | 568 | 1 | -128 |
| 21 | 569 | 567 | 2 | -126 |
| 22 | 595 | 571 | 24 | -102 |
| 23 | 566 | 568 | -2 | -104 |
| 24 | 796 | 612 | 184 | 80 |
| 25 | 594 | 609 | -15 | 65 |

ABC 2 RESPONSE TIME SMOOTHING ALGORITHM

METHOD AND APPARATUS FOR ACHIEVING AN OPTIMAL RESPONSE TIME IN A TELECOMMUNICATIONS SYSTEM

PRIORITY OF INVENTION

The instant application claims priority to the U.S. Provisional Application, Ser. No. 60/423,608, filed Nov. 4, 2002, entitled 'Method and Apparatus For Achieving An Optimal Response Time In A Telecommunications System' the contents of which is incorporated in its entirety herein.

BACKGROUND

1. Field of the Invention

The present invention relates generally to controlling traffic overload in a telecommunications network and, more particularly, to forecasting a response time of a media gateway for an overload control system of a telecommunications network.

2. Related Information

In telecommunications it is desired to transfer data through a wide bandwidth network, and as rapidly as possible. However, this must be balanced against the resources of the particular telecommunications network. Without proper control of the network resources, routing devices would soon become overloaded with data traffic and the telecommunications network would be out of service.

It is desirable, therefore, to forecast the overload of network resources in order to optimize the amount of traffic flow that a telecommunications network is capable of handling. Typically, the overload situation occurs at the bottlenecks of the telecommunications system where traffic is switched from one element to another or between networks. One such bottleneck occurs at a media gateway, where telecommunications data is converted from the format required for one type of network to the format required for another.

A common method to predict, or otherwise avoid, an overload situation in such a device is to predict a response time of the device and control the data flow to the device in accordance with the predicted response time. However, an accurate method and/or apparatus that efficiently and effectively forecasts the response time of a telecommunication device has, thus far, been elusive. One of the neglected problem aspects is alternative approaches to the principles of forecasting.

In one forecasting solution, it has been suggested to employ a moving averages technique, for example, to observe the mean average of response times for a period in the past. By observing past response times and averaging them over a number of observations, one could yield some kind of prediction about what the next future response time could be.

However, the problem with moving averages is that such a technique considers each observation equally. That is, a moving average gives no credence to the recentness of events. This is not compatible in telecommunications devices, such as the media gateway mentioned, where recent data may be more relevant. Such systems tend to be event driven and recent events have a tendency to be more relevant.

In addition, a moving average requires analysis of a large number of parameters. When the observation averaging period is relatively long, the number of parameters (and subsequent calculations) becomes unwieldy. This shortcoming is especially acute in telecommunications systems where the speed of transferring data takes precedence over computations. In telecommunications, even a small number of analyzed parameters can unsatisfactorily overland a device.

A somewhat better solution to forecasting is provided by a time-series exponential forecast. With this technique, exponentially less weight is given to older data such that a prediction of a future event is based on more heavily weighted recent data. Thus, the degree to which recent events and data are considered increases exponentially. Given a satisfactory time-series forecast technique, such a forecast could be fine-tuned for telecommunications solutions which are event driven.

The known time-series forecast, however, suffers from a number of disadvantages, making such forecasting unappealing for telecommunications applications. What has been misunderstood with the use of this forecasting technique in telecommunications are the fundamental principles underlying this technique. These principles will be discussed in more detail in relation to the present invention. Further, it is not necessary to review the afore-mentioned forecasting techniques as a general understanding therefor can be attained from the published works of Brown, R. G., Smoothing, Forecasting And Prediction Of Discrete Time Series, Prentice-Hall, Inc., Englewood Cliffs, N.J., 1963, the contents of which are incorporated herein in their entirety.

Another deficiency in present telecommunication systems is the lack of forecasting specifically addressing the particular problems that arise in such telecommunications devices as the media gateway. As mentioned, the operation of such devices are event driven, and often a relatively long time elapses between events. In attempting to forecast an overload situation, a lapse of even a few seconds between events is problematic. In particular, the system shuts down a device when a forecast predicts an overload. To restart the device, the operator typically notices the failure a few seconds after system overload, and restarts the system. However, the remnant forecast that reflected the overload condition is still resident in the system. Thus, even though the device may no longer be overloaded, the system acts on a 'false' overload condition and rejects further call traffic.

This situation is prohibitive to testing in a laboratory environment. In such an environment, overload traffic is offered to the system and the traffic is suddenly stopped. When the traffic is restarted, the system has had time to settle and the traffic restarts below the overloaded level. However, due to the above-described problem the overload control remains in effect for a few event sequences and rejects any attempts to restart the device. As a result, the lab technician is impeded from continuing testing of the network. In telecommunications laboratories, where testing of new concepts is important for product development, such shortcomings must be resolved. In the real world, the impact of such problems could cause a system to lock up, resulting in a network catastrophe and a likely loss of subscribers.

It should also not be underestimated that even moderate forecasting computations are unwieldy in a telecommunications environment. Telecommunication devices require fast switching of traffic and any extraneous computations, however simple, degrade system performance. With reference to a Unix™ environment, for example, it has been found during the development of the present invention that floating point computations yield poor performance results. Furthermore, the use of numerous parameters in these forecasting calculations not only requires additional memory, it geometrically complicates the forecasting computation.

The aforementioned problems will become starkly apparent when contrasted with the features and advantages described in the detailed description.

OBJECTS & SUMMARY OF THE INVENTION

According to one aspect of the invention, a response time of a telecommunications device is forecast.

According to another aspect of the invention, a response time of a media gateway is forecast.

According to another aspect of the invention, traffic flow of a telecommunications device is managed.

According to another aspect of the invention, an overload situation in a telecommunications device is properly handled.

According to another aspect of the invention, a false overload situation within a telecommunications device is avoided.

According to another aspect of the invention, a testing environment for a telecommunications device is provided.

It is an object of the invention to simplify computation for a telecommunications network.

In accordance with another aspect of the present invention, there is provided a system for response time estimation for a soft switch that switches communication data in a telecommunications network. A call feature server performs call control functions. A media gateway provides access to telecommunications transmission facilities. A packet manager coupled to both the call feature server and the media gateway implements message protocol conversion and call flow setup. The packet manager includes a response time estimation module for preventing traffic overload of the media gateway by the call feature server. Message retransmission times for the soft switch are processed by the response time estimation module based on empirical response times from the media gateway according to an integer-based, exponential smoothing function.

In still other aspects of the invention, there is further provided a method for controlling traffic flow in a telecommunications network according to forecasted response times. Forecasting predicts the response times of the media gateway by reiteratively weighting an observed response time of the media gateway with at least one previously forecasted response time. The weight given to previously forecasted response times is exponentially reduced. Weighting weights the forecasting for a predetermined number of iterations such that weighting an initial forecasted response time substantially greater than a recent observed response time is alleviated. Applying, after the predetermined number of iterations, an additional forecasting that reiteratively weights a current forecasted response time with previously forecasted response times of the additional forecasting such that a bias arising from the forecasting is alleviated. The traffic flow is controlled in accordance with the forecasted response times and the additionally-forecasted response times.

In still other aspects of the invention, the invention further provides a method for controlling telecommunications traffic to a media gateway when the media gateway is restarted after a period of time and a forecast response time reflects an overload condition of the media gateway before the period of time such that a false overload condition is not present upon restart of the media gateway. Forecasting predicts response times for a predetermined number of iterations upon startup using a single exponential smoothing function having a smoothing constant set such that an initial forecast response time is not substantially weighted more than a recent observed response time. Resetting the predetermined number of iterations after the period of time discards the forecast response time that reflects an overload condition such that the telecommunications traffic is not rejected upon restart of the media gateway by a false overload condition.

In yet other aspects of the invention, the invention also provides an apparatus for controlling traffic flow in a telecommunications network according to forecasted response times. A manager implements the traffic flow to the media gateway. A media gateway response forecasting module empirically forecasts response times of the media gateway for a start up period of the media gateway. The media gateway response forecasting module forecasts the response times of the media gateway for the start up period using time-series exponential forecasting, wherein the media gateway response forecasting module sets weights for the forecasting such that a weighting of an initial response time forecast substantially greater than a weight for a recent observed response is alleviated. The media gateway response forecasting module forecasts the response times of the media gateway after the start up period using time-series exponential forecasting such that a bias arising from trends occurring in the traffic flow is alleviated.

Figure 1:
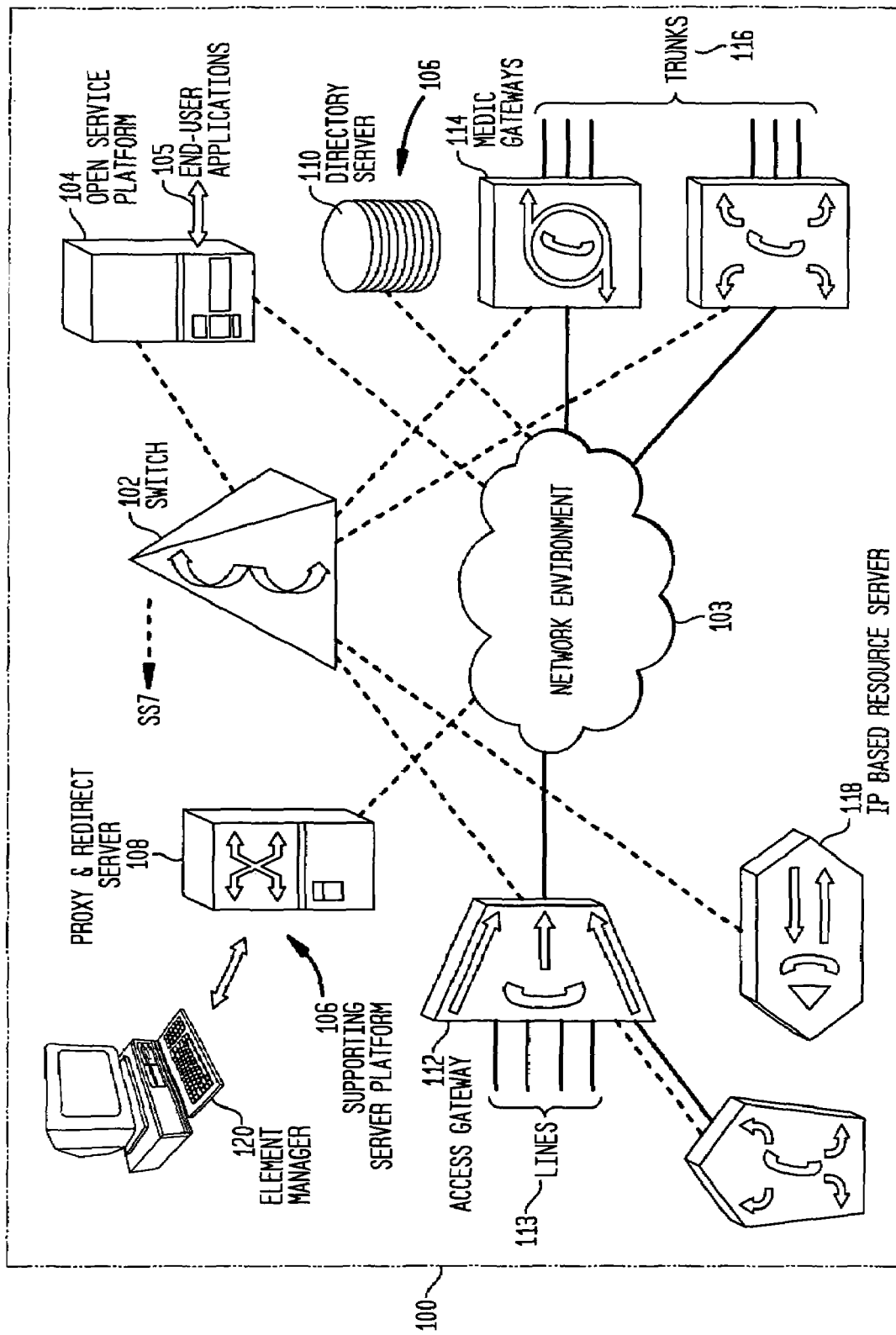
FIG. 1 illustrates a system according to one embodiment of the present invention.

The present invention, and one or more embodiments, shall now be described with reference to the enumerated figures.

DETAILED DESCRIPTION OF THE PREFERRED EMBODIMENTS

The invention will now be described with reference to the telecommunications system 100 shown in FIG. 1. While the present invention is described in terms of a particular network, it shall be appreciated that the invention is applicable to any telecommunications or computer-based environment.

In the exemplary network 100 shown, the switch 102 implements control of traffic flow in a network environment 103. This traffic flow may be, for example, in the form of packets. In one application, the switch 102 may provide Voice over Internet (VoIP) applications for controlling switching between the Internet and traditional telecommunications networks. It may also, for example, implement control resource servers, access equipment, and coordinate the network intelligence present within the different telecommunication devices in the network.

Further, to continue, the open service platform 104 delivers open programming interfaces via several application building blocks (not shown). This allows operators to implement end-user applications 105.

Supporting server platforms 106 handle various tasks. These may include a gatekeeper (not shown) that registers and routes functionality to networks. The proxy and redirect server 108 connects subscribers and domains to the telecommunications network. The directory server 110 supports the gatekeeper and proxy by means of a centralized user data base, which stores profiles of registered subscribers.

An access gateway 112 supports legacy interfaces, including, for example, POTS, ISDN-BRA, ISDN-PRA, V5.x, etc. It provides the gateway functionality for the existing access infrastructure to the IP core network. Under the control of the switch 102, the access gateway 112 guarantees a seamless feature provisioning to existing access lines 113.

The media gateways 114 are a mediation element between circuit-switched and packet-switched networks. In one aspect of the invention, the gateway provides the interface between voice networks and an IP network in order to, for example, relay voice, fax, modem and ISDN data traffic over the IP network. These media gateways 114, in the example, use trunk interfaces 116 to interconnect with circuit-switched voice networks.

An IP-based resource server 118 in the example provides resources to the user. Such resources may include announcements and user interactive dialogues for the IP Network. An element manager 120 supports operation, administration, and maintenance (OA&M) tasks. It may include, for example, functions for fault, configuration, accounting, performance, and security management. Element manager 120 may also perform integration into the web environment, integration into cross domain management systems or into the business processes of the network operator. For this, there may be provided an access terminal or computer, i.e., personal computer, etc.

As mentioned, the network illustrated in FIG. 1 is exemplary. The details of the network are provided for completeness of discussion and are not intended to limit in any way the scope of the claims to any particular computer-based network or associated network devices.

Figure 2:
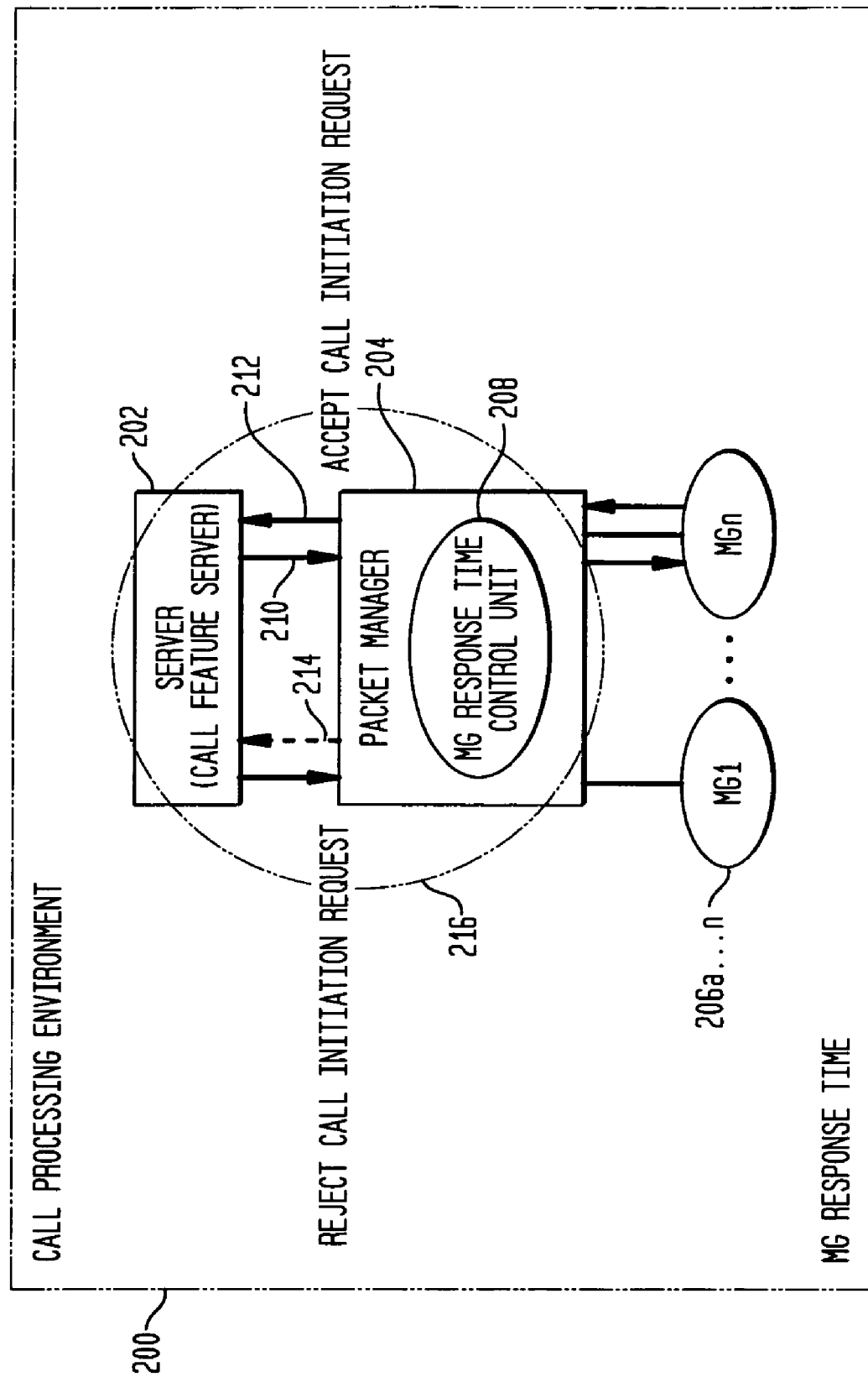
FIG. 2 illustrates a call processing environment according to one embodiment of the present invention.

With reference to processing environment 200, illustrated in FIG. 2, there is shown a server 202 that orchestrates call control functions. In the aspect shown, the server 202 is a call feature server. A manager 204 implements message protocol conversion and call set up flow control between the server and at least one media gateway 206a (FIG. 1, 114). In a packet-switched network environment, the manager 204 may be a packet manager that manages packet traffic flow of the media gateway 206a. As already mentioned, a media gateway is a device, such as a circuit switch, IP gateway, or channel bank, that converts data from the format required for one type of network to the format required for another. In general, the media gateways 206a-206n provide access to transmission facilities. A media gateway response control unit 208 is provided for forecasting response times of an associated media gateway 206a.

In operation, the server 202 requests to set up traffic flow of a call using a media gateway 206a. For this, the server 202 initiates a request 210. The manager 204 causes the media gateway response time control unit 208, which may be integrated within the manager 204, to determine or forecast a response time of the associated gateway. With the assistance of the forecasting result, the manager 204 regulates the flow of traffic in the associated gateway. In the ideal case, the manager 204 determines that the associated gateway 206a has enough capacity for the requested call 210. In this scenario, the manager 204 accepts the call request and generates an "accept call" initiation request signal 212. The server 202 then proceeds to set up the traffic flow for the call with the media gateway 206a.

A media gateway can be overloaded relatively easy. Consider a typical arrangement where several media gateways are connected to a single 2,000,000 call-per-hour switching system. This call volume may generate more than 30,000 events per second. Thus, it is easy to understand how an individual media gateway 206a can be overloaded with call requests initiated by the server 202. In this single media gateway, overloaded situation, the media gateway response time control unit 208 may forecast response times which indicate an impending overload condition, after which, the manager 204 may generate a "reject call" initiation request signal 214. In response, the server 202 receives the signal 214 and adjusts its traffic flow control accordingly to avoid an overload situation.

To accommodate these rejected calls, the server 202 determines retransmission times. A retransmission time is a time determined when the telecommunications data can be retransmitted after some failure or traffic-blocking situation, e.g. the overload situation. In this overload situation, the server 202 predicts the overload situation and determines a retransmission time in response.

In an aspect of the invention, the server 202 and the manager 204 comprise a soft switch 216. A soft switch 216 (software switch) is a computer-based switch operative open, application program interface (API) software used to bridge a public switched telephone network (PSTN) and another network by separating the call control functions of a particular phone call from the media gateway 206a to 206n. As mentioned, the other network may be a Voice over Internet Protocol (VoIP). Of course, the method and apparatus of the present invention is not limited to a soft switch, and may be implemented using any type of switch.

As mentioned, the present invention employs the principles of time series statistical forecasting in order to predict the media gateway response times.

In order to better understand the invention, a more in-depth discussion of the following single exponential smoothing forecast $F_t$ is given:

$$F_t = S_t(x) = \alpha x_t + (1-\alpha) S_{t-1}(x) \tag{0.1}$$

Wherein, $F_t$ is a single exponential smoothing forecast and $S_t(x)$ is a smoothed statistic thereof, $\alpha$ is a smoothing constant (normally set between 0 and 1) and x is a current observation for a time t.

As explained earlier, the moving average principle gives equal credence to each observed event. This is seen from the formula 0.2 below.

$$M_t = \frac{x_t + x_{t-1} + \ldots + x_{t-N+1}}{N} \tag{0.2}$$

Wherein $M_t$ is the mean and N is the total number of data items. By contrast, exponential smoothing is a time series statistical forecasting technique that provides an incremental forecast using the most recent data value and the previous, smoothed statistic. This is useful for telecommunications systems as the forecast attributes the most weight to the most recent data while exponentially discounting the value of older data.

However, the time-series exponential smoothing technique above has deficiencies that, until now, have not been fully appreciated. It is a particular problem that equation (0.1) places a substantial amount of weight or consideration on the initial smoothed statistic $S_0(x)$ relative to the most recent observation. Expanding equation (0.1) yields:

$$\alpha x_t + \alpha(1-\alpha)x_{t-1} + \ldots + \alpha(1-\alpha)^n x_{t-n} + \ldots + (1-\alpha)^k x_0 \quad (0.3)$$

It shall be seen from the above that, after k observations, the weight given to the initial smoothed forecast $S_0(x)=x_0$ turns out to be $(1-\alpha)^k$. Given a smoothing constant, say of $\alpha=0.1$, the weight given to the initial smoothed forecast after 10 observations equates to 0.348678. This is more than three times the weight $\alpha=0.1$ given to the most recent observation $x_t$. It has been further determined that the weight on the initial smoothed forecast is even more extreme for observations between 0<k<10.

This is problematic for a system in which a greater emphasis on more recent events is desired. Furthermore, the problem is quite troubling in practical applications. As mentioned, telecommunication devices tend to be event driven, and the worst case scenario of an impending overload event would not be forecasted by the exponention switching technique since it would place too much emphasis on the earlier data. In that case, the media gateway would crash, which could adversely affect the overall network. Furthermore, after the crash, the remnant initial forecast predicted during the overload would tend to cause a false overload forecast, thereby rejecting any new calls upon the start-up of the system.

Another shortcoming of the forecasting technique above (0.1) that has not been fully appreciated, particularly in regard to telecommunications, is that this forecasting technique tends to generate a bias for telecommunications data. In particular, telecommunications data tends to be cyclical over a relatively long period of time. Cyclical data tends to be troublesome for such forecasting techniques (0.1), despite the fact that the number of observations taken for a telecommunications system is restricted and relatively tightly bounded within even data cycle. Within such a bounded sampling window, the cyclical data tends to follow a ramp function.

The problem is somewhat observed by Brown (Id., pp. 114-115). The forecast technique above (0.1) develops a bias, i.e., a lag in the forecast behind the actual observations. The dilemma is that the bias can be reduced by selecting a smoothing constant ($\alpha$) near unity. However, it shall be understood from studying the above forecast technique (0.1) that setting $\alpha$ near unity is not very helpful because the previously forecasted response times are nearly canceled by the weight of $\alpha-1$. The result of a current forecast would nearly equal the most recent observation, thereby providing no forecasting whatsoever.

With the two weighting scenarios above as examples, the unappreciated forecasting deficiency is that telecommunications systems tend to fall victim to bias. Historically speaking, previous forecasting systems did not have the advantage of having telecommunications systems having long term data patterns on which to base their forecasts. Thus, proper forecasting may not have been fully appreciated in the context to telecommunications until now. For a further reading of forecasting concepts in general, the reader is directed to Griffin, W. C., Introduction to Operations Engineering, Irwin, Inc., Homewood Ill., 1971 Adjunct Performance Analysis, the contents of which are incorporated herein in its entirety.

To address the above-mentioned problems, the present invention creates a startup procedure to resolve the issue of weighting the initial forecast and then addresses the problem of bias by applying a second exponential smoothing function. In other words, the invention presents an empirical approach to forecasting response times of a media gateway that takes into consideration the unique requirements of a telecommunications system. As will be further described below, the invention further refines this empirical approach for the particular call processing environment previously described with reference to FIG. 2.

Stated alternatively, the present invention provides a start up procedure that alleviates the problem of weighting an initial forecasted response time substantially greater than a recent observed response time. The start up procedure is set for a predetermined period, in this case a number of iterations, to counteract the tendency for this problem to arise within the first several observations of data and associated events.

The start up period, according to one aspect of the invention, resets the smoothing constant for the predetermined period. In one aspect, the smoothing constant is reset in order to effectively distribute the consideration given to the observed response times evenly such that any tendency to emphasize the initial forecast is nullified. The present invention elegantly accomplishes this by resetting the smoothing constant to be inversely proportional to the current iteration number (n), as shown below by the formulation:

$$F_t = S_t(x) = \frac{1}{n}x_t + \left(1 - \frac{1}{n}\right)S_{t-1}(x) \quad (1.2.1)$$

It shall be noted that the number (n) in the above formulation (1.2.1) is not the total number N of observations, but the current iteration number. With this formulation, the total weight over n reiterations for a particular observation is an equal distribution of the weights. Thus, for example, given the 3$^{rd}$ iteration (n=3), the weight for the current observation is $$\frac{1}{n} \text{ or } \frac{1}{3};$$

the weight for the second observation is $$\left(1 - \frac{1}{n}\right) \text{ or } \frac{2}{3},$$

but taking into account the previous weight assigned to the 2$^{nd}$ observation $$\frac{1}{n} = \frac{1}{2},$$

the total weight for the 2$^{nd}$ iteration is $$\frac{2}{3} \times \frac{1}{2} \text{ or } \frac{1}{3}.$$

Similarly, the total weight computed for the original observation, given the two previous iterations, is $$\frac{2}{3} \times \frac{1}{2} \times 1 \text{ or } \frac{1}{3}.$$

As will be seen, the forecasting method of the present invention provides equal (or substantially equal) weighting. The elegance of this arrangement is that the invention at once exploits the advantage that an exponential smoothing formulation requires only the parameters n, $x_t$ and $S_t(x)$ (ie, the current observation and the previous forecast) while taking advantage of the principle that a mean distribution flattens out the effects of perturbations in a series. Of course, the particular implementation of forecasting the method using the formula described above is not so limited to setting the weights equal, but instead may include within its scope other formulas that would tend to nullify the effect of emphasizing the initial forecast.

What is more, the present telecommunications forecasting method provides for the automatic mitigation of the weighting problem by predetermining the number of iterations which are necessary to apply the start up process (1.2.1). To that end, the invention has related the number of iterations selected to the tendency to emphasize the weighting of the initial forecast. More specifically, empirical investigations have determined that the smaller the smoothing constant, the greater the problem of the weighting of the initial forecast. This is because a small smoothing constant results in a larger weight assigned to the initial forecast.

In one aspect, the present forecasting invention sets the number of iterations inversely proportional to the smoothing constant. Thus, when the smoothing constant is small, the number of iterations for the start up process is set proportionally high. Conversely, a larger smoothing constant, yields not as significant a problem with weighting the initial forecast and the number of iterations for the start up process is subsequently lower. This is seen in the formula (1.2.1.1) below, wherein the number of iterations for the start up process is given as:

(1.2.1.1) start up process is executed while, $$0 < n < \frac{1}{\alpha}$$

After the initial start up period, the forecasting method of the invention then addresses the problem of bias. It well recognized that, as time goes on, the data tends to follow a ramp function. This stems from the fact, as mentioned earlier, that telecommunications traffic tends to be cyclical. The present invention takes this into account and provides reincorporating the smoothing constant and thereafter applying a second smoothing equation. Although double forecasting is generally known, it should be appreciated that no specific example is known of how to apply the theorems presented herein, in the particular manner provided herein, e.g. using such an empirical approach to provide forecasting to alleviate the particular problems of a computer-based or telecommunications network.

The additional smoothing function is given by substituting the recent forecast from the first forecast into the smoothing theorem and weighting it with respect to previously double-smoothed forecasts $S_t^{[2]}(x)$, as given by:

$$S_t^{[2]}(x) = \alpha S_t(x) + (1-\alpha) S_{t-1}^{[2]}(x) \quad (1.3.1)$$

It shall be appreciated that the forecasting method of the present invention minimizes the number of required parameters while improving the accuracy of the forecasting. In particular, empirical application of additional theorems actually result in more poorly tracked response times. This results from the additional variables added to the computation which creates more uncertainty in the forecasting. The additional computations and associated computer memory space required for the extra parameters merely add overhead to the simplicity of using multiple smoothing equations.

In the present invention, the additional smoothing function is found to provide excellent forecasting results while requiring only one additional datum, i.e. the parameter $S_{t-1}^{[2]}(x)$. As described later, the forecasting method of the present invention provides this data, which results in a good tracking of telecommunications that tends to follow a ramp function. Of course, this is not to say that the invention is limited to a single or double exponential series, but only that the invention has found a good relationship between the smoothing presented herein and the accuracy of the resultant forecasting.

The forecasting method of the present invention rearranges (1.3.1) to facilitate tracking a ramp function and, to that end, is rearranged in terms of a linear function:

$$F_t = a_t + b_t L \quad (1.3.2)$$

Wherein, $a_t$ represents the forecast for the y-axis intercept, $b_t$ represents the forecast slope and L represents the lead time. This arrangement provides for easier processing by the packet manager 204 (FIG. 2). In one embodiment, the forecasting apparatus of the present invention sets the lead time L to unity, so as to minimize the lead time in the forecast as much as possible. Thus, (1.3.1) is rearranged in terms of (1.3.2) as follows:

$$a_t = 2S_t(x) - S_t^{[2]}(x) \quad (1.3.3)$$

$$b_t = \frac{\alpha}{1-\alpha}[S_t(x) - S_t^{[2]}(x)] \quad (1.3.4)$$

Further, an additional consideration is the selection the initial forecast time $S_{t0}^{[2]}(x)$ of the second smoothing operation, since it has not been previously calculated. The present invention is directed to the situation where a system is restarted after overload. At this time, therefore, the system is relaxed and the initial forecast $S_{t0}(x)$ of the first smoothing forecast adequately reflects the condition of the system. The forecasting method and apparatus of the present invention recognizes this and sets the initial forecast time of the second smoothing operation $S_{t0}^{[2]}(x)$ to the initial forecast time of $S_{t0}(x)$.

Figure 3A:
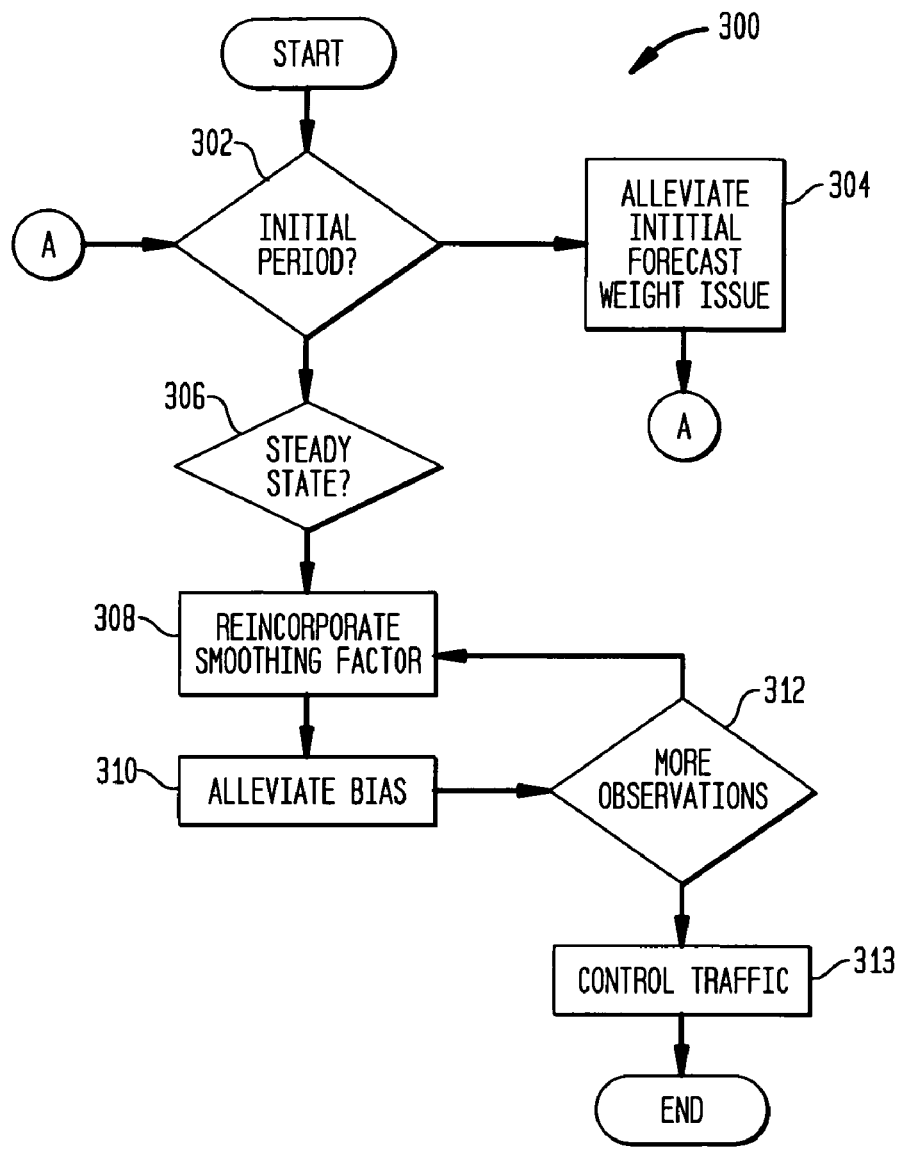
FIGS. 3a, b are flow diagrams according to one embodiment of the present invention.

The process steps 300 of the present invention will be discussed with reference to the flow diagram of FIG. 3a. In step 302, the invention determines whether the forecasting is in the initial period, or startup period. This is done, for example, by determining whether the iteration number is within the range of $$\frac{1}{\alpha}$$

(see above). If the invention determines that the forecasting is in the start up phase, the process flow advances to step 304 where the forecast is generated to alleviate the initial forecast weighting problem.

In the exemplary invention, the response times of the media gateway are forecasted by reiteratively weighting an observed response time of the media gateway with at least one previously forecasted response time. The weight given to previously forecasted response times is exponentially reduced. As earlier described, this may be achieved by setting the smoothing constant inversely proportional to the iteration number.

This start up process continues, as indicated generally by (A), until the observations tend not to cause the weighting problem described. In other words, the forecast is performed reiteratively taking into account the previous results. The start up process ends when the observations reach a so-called steady state in step 306. This is determined, in one aspect, when the forecasting reaches the predetermined number of iterations. For the condition (1.2.1.1), the predetermined number of iterations is set to the inverse of the smoothing constant.

The flow of control leaves the start up phase and initiates forecasting to alleviate the bias described above. This is done in the exemplary method by applying an additional forecasting. According to the process in step 308, the invention reincorporates the smoothing constant into the time-series exponential equation. In step 310, the process applies the second time-series exponential forecast to alleviate the bias. The process reiteratively continue according to step 312 until all of the observations are processed. Based on the above, the server 202 (FIG. 2) controls and directs telecommunication traffic including, for example, call, set up/tear down of the media gateway in step 313.

It shall be appreciated that the inventive process described may be executed by a computer processor such as supplied by a Unix™ Sun™ system. For that matter, it is envisaged that the process is embodied within the software of a soft switch. Further, the soft switch may be formed as a device driver of the Sun™ system. Of course, these are merely examples of the applications of the invention and the invention is not so limited. One skilled in the art of programming the software structures within telecommunications networks including general computers, such as the Unix Sun™ system, will readily realize various implementations of the invention therein.

We shall now turn to the problems of forecasting as they particularly relate to telecommunications. Specifically, there are problems associated with adapting this model to response time estimation within the packet manager's computer environment. A particularly preferred embodiment of the present invention identifies and provides solutions for these problems. One solution provided by the invention may be thought of as a combination of techniques encapsulated in a set of equations that are, for example, implemented by the packet manager 204 (FIG. 2) of the invention for estimating a media gateway response time.

Although the problem that telecommunications systems tend to be event driven has already been mentioned, a more thorough understanding of the problem shall be provided here in the context of the packet manager 204. Advantageously, using response times for traffic overload control purposes has the statistical property that their sampling rate increases with traffic load, allowing for a quick response to an overload condition. The response time statistic does, however, require the system to be concerned with the time between events because, if a relative long time since the last response time has elapsed, the forecasted response time does not accurately reflect an actual state of the system traffic.

Within the context of the invention, a relative long period of time is any time longer than a period that represents the current state of the traffic flow accurately. In a test environment, it has been found that a human operator normally takes 3-5 seconds to recognize an overload failure and restart the system. Considering that operations occur in milliseconds, it may be that a $10^{th}$ of a second is a relatively long time. In any event, the invention is not so limited in range to a specific period.

To continue, the forecasted time reflects an earlier traffic condition and, more particularly, an earlier overload condition. In this situation, the first call presented to the system will likely be rejected because of a 'false' overload condition. The worst case scenario can be observed in the controlled setting of a laboratory wherein overload traffic is offered to a system. The traffic is suddenly stopped because of the overload condition. Then, the traffic is restarted below the overload level, as the system has had time to settle. However, the overload control remains in effect for one or more event sequences.

Figure 3B:
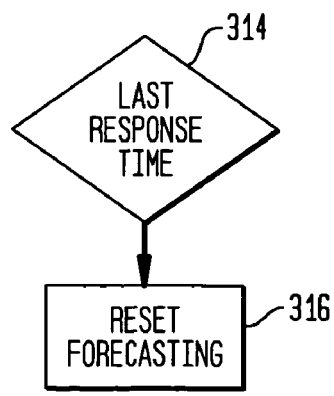

In one aspect, the forecasting of the present invention alleviates this problem by setting the consideration of the initial period substantially equal, to the current observation thereby ensuring that an initial forecast is not given too great a consideration. The invention further provides the solution to this problem in the context of response time overload by monitoring the time of the last response and resetting the forecasting mechanism. In the test environment example, the time is set to 3 to 5 seconds. If it has been at least this time since the last update, then the invention resets the forecasting. This is illustrated in FIG. 3*b*, where the time of the last response (T) is monitored in step 314 and the forecasting is reset in step 316 when the period exceeds the predetermined time (T). Effectively, the response time forecast reflecting the earlier overload condition is discarded.

In one aspect, the present invention sets the observation number to unity, n=1, for the current event. This has the effect of resetting the forecasting mechanism to the startup state and results in the current forecast being set to the value of the current event. Further, the invention recognizes that the current event response time will be small in this particular situation because it has been some time since the last response. By resetting the forecasting, the invention advantageously generates a high degree of traffic in order to optimize bandwidth right from the start up of the system.

As previously noted, telecommunications systems have few spare resources to devote to non-traffic related work, even for the easiest computations. Floating point numbers are particularly problematic to accommodate in such a system. In the test environment, standard systems, such as a Sun™ Unix™ computer used for testing and driving such networks, have experienced an especially difficult time when processing non-integer values. To that end, the present forecasting invention has provided a system for arranging and providing integer-based computations that are more easily processed. Further, in one particularly preferred embodiment of the present invention, the order of computation is from easiest to more difficult. In yet another aspect, the invention orders the computations in the particular order of addition, subtraction, multiplication and division, i.e., placing the easiest computations first.

In one aspect, the invention implements the integer math in the computations by setting the smoothing constant $\alpha$ inverse to the iteration number $$\frac{1}{n}$$

and rearranging as shown below. Notice further that the equations are arranged in fraction form in order to ensure that easier operations, such as addition, subtraction and multiplication are processed before division. Thus, for the initial period $$n < \frac{1}{\alpha},$$

the invention provides:

$$F_t = S_t(x) = \frac{x_i + (n-1)S_{t-1}(x)}{n} \quad (2.3.1)$$

After the start up period, i.e., $$n \geq \frac{1}{\alpha},$$

the invention sets α to a constant by setting α to the inverse of the last iteration number of the start up period ($n_\alpha$) for all equations until reset. The arrangement is advantageous in that the packet manager 204 does not have to load new equations after the start up period is complete. After the initial period, the manager 204 need only substitute the value $n_\alpha$ for n in (2.3.1).

In terms of a ramp function, the equations become even more manageable. For $a_t$, the equation is identical as in (1.3.3). The reason for this is that there is no smoothing constant in this equation, as will be seen below:

$$a_t = 2S_t(x) - S^{[2]}_t(x) \quad (2.3.2)$$

Indeed, it shall be seen that there is only one smoothing term with which to be concerned, as shown in the second part of the ramp $b_t$ as follows:

$$b_t = \frac{S_t(x) - S^{[2]}_t(x)}{n_\alpha - 1} \quad (2.3.3)$$

It shall be further appreciated that the invention provides for easier upgrading of software and/or hardware. The one set of equations concept and arrangement of terms for easier processing lends itself to being utilized in almost any computer-based system which require forecasting. In this regard, the invention utilizes the response times, directly or indirectly through another source, from the media gateway. This is shown in FIG. 1 generally. Such response times are vendor and configuration independent. By utilizing the response times from the media gateway, the present invention advantageously interfaces easily with existing systems and relies entirely upon non-proprietary information.

Figure 4:
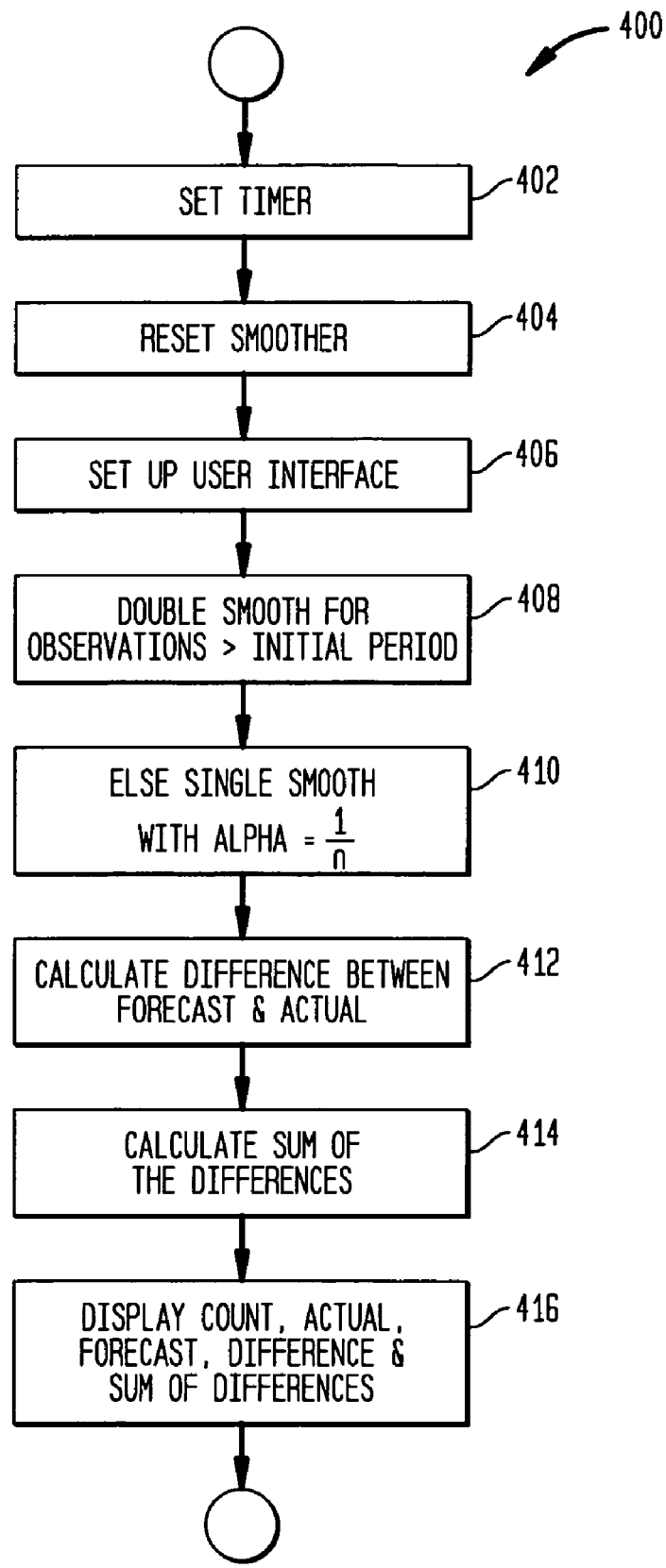
FIG. 4 is a flow diagram according to one embodiment of the present invention.

The present invention also provides a testing tool for testing a forecasting system which will now be described in reference to the flow diagram 400 of FIG. 4. In step 402, a timer is set. Those skilled in the art will realize how to set a timer in such a system. In step 404, the smoother, i.e., forecast series, is reset. In step 406, a user interface is set up. This interface may report, for example, the count and forecast for each iteration. It may also provide a difference between the forecast and actual data for comparison. Of course, the invention is not so limited to any specific interface and may include a more elaborate user interface as part of the element manager 120 (FIG. 1), for example.

To continue, the process executes the double smoothing forecast if the initial period is completed in step 408, else the single smoothing process is executed with the smoothing constant set for each iteration to the inverse of the iteration number, as provided in step 410. The process 400 employs, for example, the single and double smoothing, respectively. A difference is calculated in step 412 and a sum of the differences in step 414 is further calculated. These last statistics, as well as others, are provided to assist with the analysis of the forecast system. In step 416, the results are displayed. The process is reiteratively executed until all of the observations are processed.

The testing tool, or forecasting techniques for that matter, may be incorporated into a software program written in, for example, C language. The program may be Unix™ compatible and may be incorporated into a device driver therefor. The program may be provided as a product, such as recorded in/on a computer readable medium, ie, memory or disk. Of course, these are but examples of implementations of the test tool of FIG. 4 and the invention actually comprises the broad testing concept implemented by any technique.

Figure 5B:
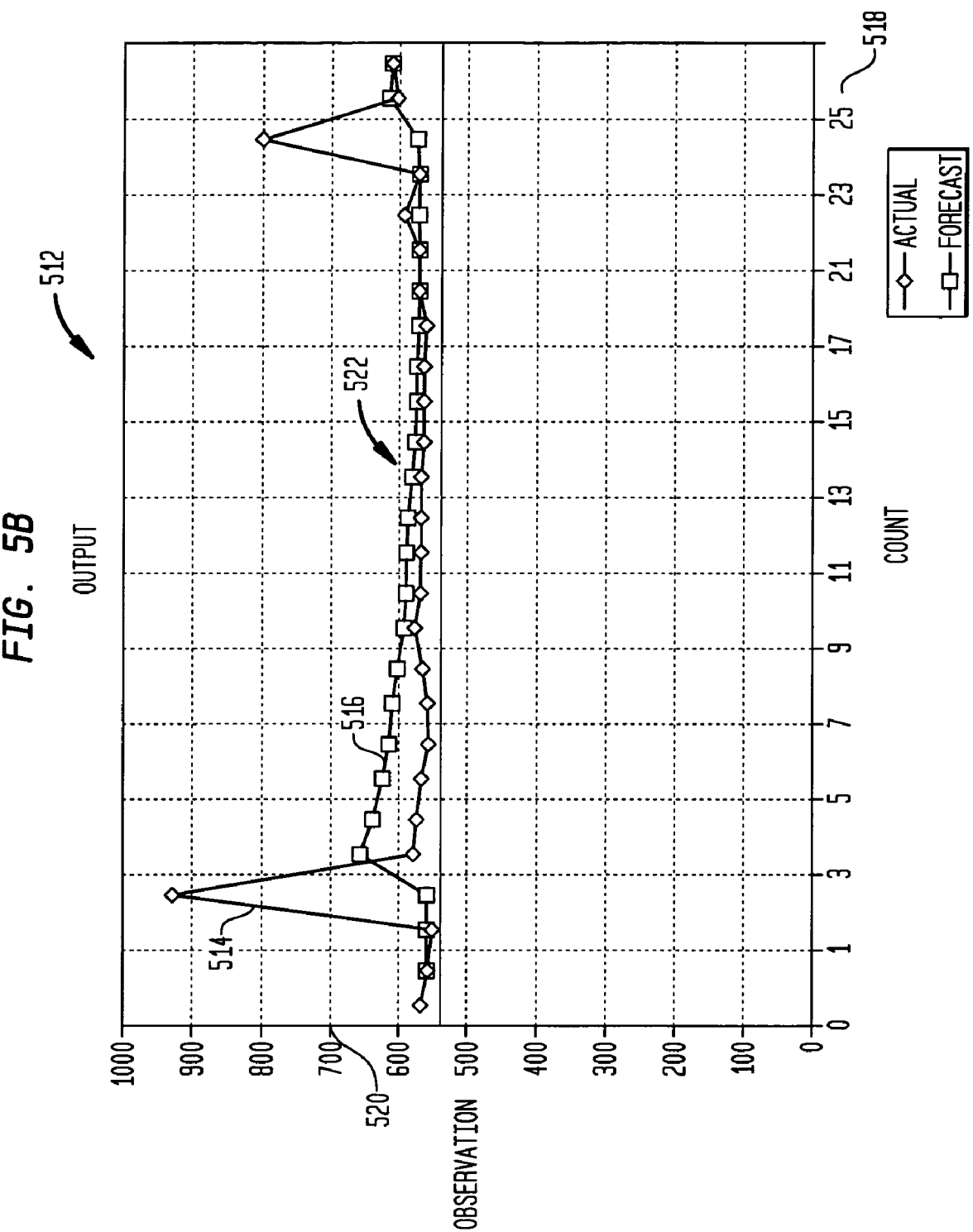
FIGS. 5a, b are a table of an exemplary output and corresponding plot according to one embodiment of the present invention.

An exemplary application of the afore-described forecasting technique and testing tool is illustrated in FIGS. 5a and 5b. In FIG. 5a, there is shown the results of a response time smoothing application 500. The count of each iteration is illustrated in the column 502. Reference numeral 504 indicates the corresponding observation for the iteration 506 indicates a forecast generated based on the forecasting techniques described above for the next iteration. A difference between a current observation and the forecast for that iteration (determined in the earlier iteration) is indicated by 508. 510 indicates a sum of the differences in the column indicated by reference 508.

The inventive results are illustrated in FIG. 5b in the form of a line graph 512 that shows actual observations of response times 514 as compared with the forecasted response times 516. The count 518 for each observation is indicated along the abscissa (X-axis), while the value 520 of each observation is indicated along the oordinate (Y-axis).

It shall be appreciated from FIGS. 5a and 5b that the smoothing constant α is set to 0.10. Thus, for the first $$\frac{1}{\alpha}$$

observations, here $$\frac{1}{0.10} = 10 \text{ observations},$$

observations, the start up forecasting technique is used according to the invention. As shown, although there is an initial spike in the observation data (count 4), the invention smoothes this data by distributing the weighting for the first 10 observations. It may be, for example, that observation 4 is a remnant forecast from a previous overload condition.

In this case, the invention is not fooled by the false overload forecast and continues uninterrupted. It shall be noticed, however, that in the case of a real overload, the invention would tend to register this condition because similarly large observations would be sensed, causing the overall mean of the first 10 forecasts to approach an overload state.

After the initial period, the invention employ the double forecasting technique described. According to the particular aspect described, the smoothing constant α is set to the constant value of $$\frac{1}{n}, n = 10$$

in the example, for each iteration thereafter. It shall be seen from FIG. 5*b*, that the invention charts the ramp 522 quite well. Once the technique reaches the steady state, any tendency towards bias appears to be eliminated.

In addition, the anomaly at the end of the series (count number 24) does not upset the forecasting. By this time, the steady state indicates that response times overall are fairly consistent. The forecasting series senses this and acts accordingly by forecasting a slightly higher response time. Actually, it can be seen that the forecasted response time for count 25 nearly matches the observation after the anomaly, which illustrates the accuracy of the present invention.

It shall be appreciated that the forecast tends slightly above the actual observation in the steady state. This is intended by the invention in order to curb any tendency of bias to cause the forecast to lag behind the actual observation. This is done in the invention by employing integers. As already indicated, the invention provides an integer process for alleviating computational delays. Here, the tendency of integer computations to round up in processors is capitalized on in order to favor a slight overestimation of the response time such that any tendency toward a bias is eliminated.

Thus, the present invention provides exponential smoothing of the estimation of a telecommunications device response time. More particularly, the invention provides a manager's application of exponential smoothing of the estimation of a media gateway's response time. The response times produced are used by the manager to provide media gateway traffic overload control and message retransmission functionality. The invention lies in as much in the start up routine as it does in a combination of the novel aspects, such as the empirical approach using an additional smoothing as a solution to the forecasting problems. In addition, the creation of an integer solution for implementing the forecasting by itself or in combination with the other aspects is advantageous. These aspects are seen in the advantages of the invention, including relative ease of integration of the invention with current systems. Not to mention, the invention provides improved efficiency of network resource usage owing to the arranging of the formulations in integer form and in an order that eases computation. In addition, relatively little storage space is needed for the linear series parameters. With such improved efficiency and performance, higher volumes of event data, ie, response times, may be processed and throughput under overload conditions is maximized in the present invention.

The present invention has been described in terms of at least one example. However, nothing in this description shall be considered to limit the invention to any specific embodiment or the features thereof to any limited range of equivalents. Rather, the invention encompasses the broad concept of forecasting and, more particularly, forecasting response times for a telecommunications system. The invention further encompasses the various novel aspects described. Of course, the present invention may be embodied in other forms such as a business method for operating a telecommunications system to provide improved service to a subscriber. These and other formulations of the invention shall be readily understood by any one skilled in the art in light of the illuminative description.

The invention claimed is:

1. An apparatus for controlling traffic flow in a telecommunications network according to forecasted response times, the apparatus comprising:

a manager (204) for implementing the traffic flow of a media gateway (206*a*);

a forecasting module (208) that empirically forecasts response times of the media gateway (206*a*);

wherein the forecasting module (208) forecasts the response times of the media gateway (206*a*) for an initial period using exponential smoothing forecasting, wherein the forecasting module (208) sets weights for the exponential smoothing forecasting such that a weighting of an initial response time forecast substantially greater than a weight for a recent observed response during the initial period is alleviated; and wherein the forecasting module (208) forecasts the response times of the media gateway (206*a*) after the initial period using exponential smoothing forecasting such that a bias arising from forecasting the traffic flow is alleviated.

2. The apparatus of claim 1, wherein the manager (204) controls the media gateway (206*a*) In accordance with the forecasts of the forecasting module (208).

3. The apparatus of any of the preceding claims, wherein the forecasting module (208) is reset after a predetermined period of time in order to reset a previous overload condition of the media gateway such that a subsequent call is accepted by the media gateway (206*a*).

4. The apparatus of claim 1, wherein the exponential smoothing forecasting for the initial period produces a mean of observed response times.

5. A method (300) for controlling traffic flow in a telecommunications network according to forecasted response times, the method comprising the steps of:

forecasting (304) response times of a media gateway by reiteratively weighting an observed response time of the media gateway with at least one previously forecasted response time, wherein a weight given to previously forecasted response times is exponentially reduced;

weighting (304) the forecasting for a predetermined number of iterations such that weighting an initial forecasted response time substantially greater than a recent observed response time is alleviated; and applying (310), after the predetermined number of iterations, an additional forecasting that reiteratively weights a current forecasted response time with previously forecasted response times of the additional forecasting such that a bias arising from the forecasting is alleviated.

6. The method of claim 5, further comprising the step of controlling (313) the traffic flow in accordance with the forecasted response times of the forecasting and the additional forecasting.

7. The method of any of the preceding claims 5-6, further comprising the step of resetting (316) forecasting after a predetermined time such that a false overload condition of the media gateway arising from a forecast reflecting a previous overload is not indicated.

8. The method of claim 5, wherein forecasting for the predetermined number of iterations produces a mean of observed response times.

9. The method of claim 5, further comprising the step of arranging operations for a processor to execute relatively simpler processes of the forecasting before complex processes.

10. The method of claim 5, wherein the step of weighting (304) sets a smoothing constant, which exponentially weights previously forecasted response times, inversely proportional to an iteration number for each iteration.

* * * * *